(12) United States Patent
Tomita et al.

(10) Patent No.: US 8,979,649 B2
(45) Date of Patent: Mar. 17, 2015

(54) INFORMATION PROCESSING DEVICE THAT CHANGES A DETERMINATION AREA OF AN IMAGE CANDIDATE BASED ON POSITIONAL RELATIONSHIPS BETWEEN IMAGE CANDIDATES, CONTROL METHOD FOR INFORMATION PROCESSING DEVICE, PROGRAM, AND INFORMATION STORAGE MEDIUM

(75) Inventors: Hiroyuki Tomita, Saitama (JP); Kazuaki Matsumura, Tokyo (JP); Tomomi Tsubakisawa, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 571 days.

(21) Appl. No.: 13/262,095

(22) PCT Filed: Oct. 22, 2009

(86) PCT No.: PCT/JP2009/068210
§ 371 (c)(1),
(2), (4) Date: Sep. 29, 2011

(87) PCT Pub. No.: WO2010/113346
PCT Pub. Date: Oct. 7, 2010

(65) Prior Publication Data
US 2012/0019472 A1 Jan. 26, 2012

(30) Foreign Application Priority Data
Mar. 31, 2009 (JP) ................................. 2009-088547

(51) Int. Cl.
*A63F 9/24* (2006.01)
*A63F 13/00* (2014.01)
*G06F 17/00* (2006.01)
*G06F 19/00* (2011.01)
*G06F 3/041* (2006.01)
*A63F 13/40* (2014.01)

(52) U.S. Cl.
CPC ......... *A63F 13/10* (2013.01); *A63F 2300/1075* (2013.01); *A63F 2300/204* (2013.01); *A63F 2300/6045* (2013.01); *A63F 2300/8011* (2013.01)
USPC .............................................. 463/31; 345/173

(58) Field of Classification Search
USPC ......... 345/156–184; 463/1–47; 715/705–715, 715/856–862; 178/18.01–20.04
See application file for complete search history.

(56) References Cited

U.S. PATENT DOCUMENTS

2005/0176502 A1* 8/2005 Nishimura et al. ............. 463/31
2007/0146338 A1* 6/2007 Kiuchi .......................... 345/173

FOREIGN PATENT DOCUMENTS

JP 2002-297283 A 10/2002
JP 2003-280782 A 10/2003
(Continued)

OTHER PUBLICATIONS
Japanese Office Action corresponding to Japanese Patent Application No. 2009-088547, dated Dec. 11, 2012.

*Primary Examiner* — Ryan A Lubit
(74) *Attorney, Agent, or Firm* — Sughrue Mion, PLLC

(57) ABSTRACT

To provide an information processing device capable of improving operability in an information processing device in which when a position in any of a plurality of determination areas for a plurality of selected image candidates is designated by a user, a selected image candidate corresponding to the determination area is designated as a selected image. A designated position obtaining unit (106) obtains a position designated by a user. A designation unit (110), when the position obtained by the designated position obtaining unit (106) is included in a determination area for a selected image candidate, designates the selected image candidate as a selected image. When any of the plurality of selected image candidates is designated as a selected image, a determination area change unit (112) changes the determination area for another selected image candidate among the plurality of selected image candidates, based on the positional relationship between the other selected image candidate or the determination area for the other selected image candidate and the selected image or the determination area for the selected image.

6 Claims, 14 Drawing Sheets

(56) References Cited

FOREIGN PATENT DOCUMENTS

| JP | 2005279165 A | 10/2005 |
| JP | 2007175260 A | 7/2007 |
| JP | 2008-154777 A | 7/2008 |
| JP | 2008-154778 A | 7/2008 |

* cited by examiner

| PLAYER ID | REFERENCE POSITION | DEFORMATION FLAG |
|---|---|---|
| A | (Xa, Ya) | 1 |
| B | (Xb, Yb) | 0 |
| C | (Xc, Yc) | 1 |
| D | (Xd, Yd) | 1 |
| E | (Xe, Ye) | 1 |

| (Xb, Yb) |
|---|

| PLAYER CHARACTER COMBINATION | COOPERATION PARAMETER |
|---|---|
| A, B | 90 |
| ... | ... |
| B, C | 82 |
| B, D | 55 |
| B, E | 38 |
| ... | ... |

INFORMATION PROCESSING DEVICE THAT CHANGES A DETERMINATION AREA OF AN IMAGE CANDIDATE BASED ON POSITIONAL RELATIONSHIPS BETWEEN IMAGE CANDIDATES, CONTROL METHOD FOR INFORMATION PROCESSING DEVICE, PROGRAM, AND INFORMATION STORAGE MEDIUM

TECHNICAL FIELD

The present invention relates to an information processing device, an information processing device control method, a program, and an information storage medium.

BACKGROUND ART

There is known an information processing device in which, when a position in any of a plurality of determination areas for a plurality of selected image candidates is designated by a user, a selected image candidate corresponding to the determination area is determined as a selected image (an image selected by a user). As one example of such an information processing device, there is available a soccer game device in which, when a position in any of the plurality of determination areas for a plurality of player characters is designated by a user, a player character corresponding to the determination area is determined as being selected, and a pass to the player character selected is carried out.

PRIOR ART DOCUMENT

Patent Document 1: Japanese Patent Laid-open Publication No. 2008-154777

DISCLOSURE OF THE INVENTION

Problems to be Solved by the Invention

For the above described information processing device, it is strongly desired to improve operability so that a user can readily select a selected image candidate.

The present invention has been conceived in view of the above, and aims to provide an information processing device, an information processing device control method, a program, and an information storage medium capable of improving operability in an information processing device in which, when a user designates a position in any of the plurality of determination areas for a plurality of selected image candidates, a selected image candidate corresponding to the determination area is designated as a selected image.

Means for Solving the Problems

In order to solve the above described problem, an information processing device according to the present invention comprises a display control means for displaying a plurality of selected image candidates on a display means; a designated position obtaining means for obtaining a position designated by a user; a determination means for determining whether or not the position obtained by the designated position obtaining means is included in a determination area for the selected image candidate; a designation means for designating, when the position obtained by the designated position obtaining means is included in the determination area, a selected image candidate corresponding to the determination area as a selected image; and a determination area change means for changing, when any of the plurality of selected image candidates is designated as the selected image by the designation means, a determination area for another selected image candidate among the plurality of selected image candidates, based on a positional relationship between the other selected image candidate or a determination area for the other selected image candidate and the selected image or a determination area for the selected image.

A control method for an information processing device according to the present invention comprises a display control step of displaying a plurality of selected image candidates on a display means; a designated position obtaining step of obtaining a position designated by a user; a determination step of determining whether or not the position obtained at the designated position obtaining step is included in a determination area for the selected image candidate; a designation step of designating, when the position obtained at the designated position obtaining step is included in the determination area, a selected image candidate corresponding to the determination area as a selected image; and a determination area change step of changing, when any of the plurality of selected image candidates is designated as the selected image at the designation step, a determination area for another selected image candidate among the plurality of selected image candidates, depending on a positional relationship between the other selected image candidate or a determination area for the other selected image candidate and the selected image or a determination area for the selected image.

A program according to the present invention is a program for causing a computer to function as: a display control means for displaying a plurality of selected image candidates on a display means; a designated position obtaining means for obtaining a position designated by a user; a determination means for determining whether or not the position obtained by the designated position obtaining means is included in a determination area for the selected image candidate; a designation means for designating, when the position obtained by the designated position obtaining means is included in the determination area, a selected image candidate corresponding to the determination area as a selected image; and a determination area change means for changing, when any of the plurality of selected image candidates is designated as the selected image by the designation means, a determination area for another selected image candidate among the plurality of selected image candidates, depending on a positional relationship between the other selected image candidate or a determination area for the other selected image candidate and the selected image or a determination area for the selected image.

An information storage medium according to the present invention is a computer readable information storage medium storing the above described program.

According to the present invention, it is possible to improve operability in an image processing, when a user designates a position in any of the plurality of determination areas for a plurality of selected image candidates, for designating a selected image candidate corresponding to the determination area as a selected image.

According to one aspect of the present invention, the determination area change means may deform or move the determination area for the other selected image candidate, depending on a direction from the other selected image candidate or the determination area for the other selected image candidate to the selected image or the determination area for the selected image.

According to one aspect of the present invention, the determination area change means may deform, move, or enlarge the determination area for the other selected image candidate, depending on a distance between the other selected image candidate or the determination area for the other selected image candidate and the selected image or the determination area for the selected image.

According to one aspect of the present invention, the determination area change means may include a selection means, when the designation means designates a second selected image candidate as the selected image and thereafter a first selected image candidate as the selected image, for selecting at least one of a plurality of determination areas for the plurality of selected image candidates, based on a positional relationship between the first selected image candidate or a determination area for the first selected image candidate and the second selected image candidate or a determination area for the second selected image candidate, and a means for changing the determination area selected by the selection means, depending on a positional relationship between a selected image candidate corresponding to the determination area or the determination area and the first selected image candidate or the determination area for the first selected image candidate.

According to one aspect of the present invention, the information processing device may be a game device. The information processing device may include a storage means for storing a parameter so as to be correlated to a combination of game characters. The display control means may display a plurality of game characters as the plurality of selected image candidates. The designation means, when the position obtained by the designated position obtaining means is included in the determination area, may designate a game character corresponding to the determination area as a selected game character. The determination area change means, when the designation means designates a first game character among the plurality of game characters as the selected game character, may change a determination area for a second game character among the plurality of game characters, based on positional relationship between the second game character or a determination area for the second game character and the first game character or a determination area for the first game character, and the parameter stored so as to be correlated to a combination of the first game character and the second game character.

BEST MODE FOR CARRYING OUT THE INVENTION

In the following, one example of an embodiment of the present invention will be described in detail, based on the accompanying drawings. Below, a case in which the present invention is applied to a game device which is one aspect of an information processing device will be described. Further, a case in which a game device according to an embodiment of the present invention is realized using a portable game device will be described here. However, alternatively, a game device can be realized using an installation type game device (a consumer game device), a commercial game device, a portable phone, a personal digital assistant (PDA), a personal computer, or the like.

Figure 1:
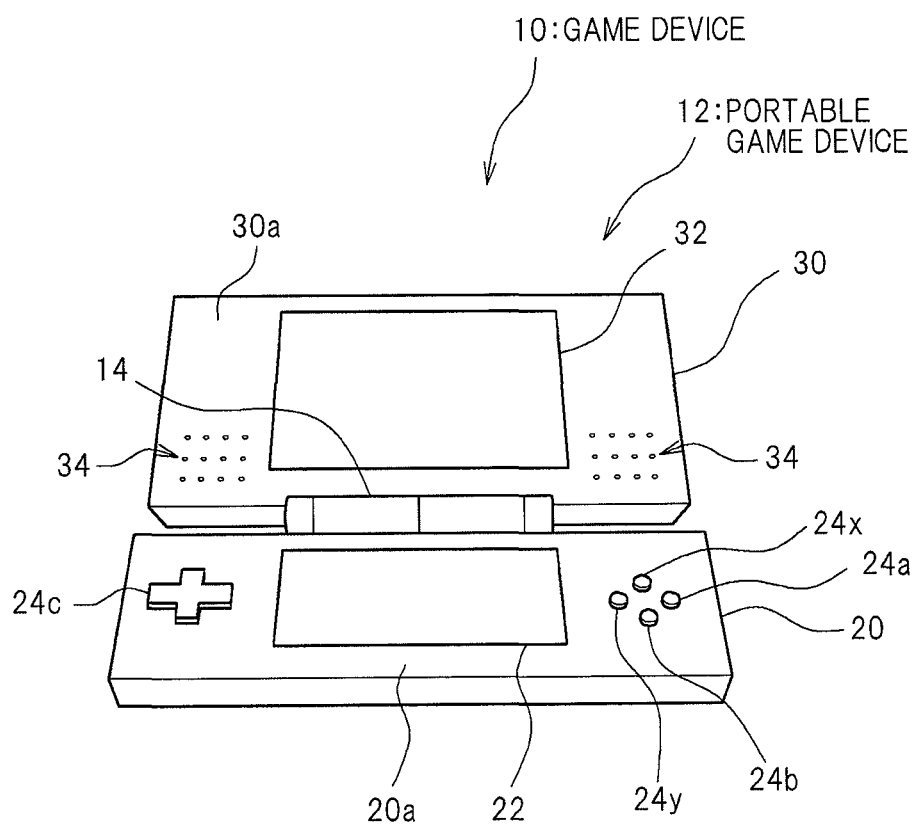
FIG. 1 is a perspective view showing external appearance of a game device according to an embodiment of the present invention.
Figure 2:
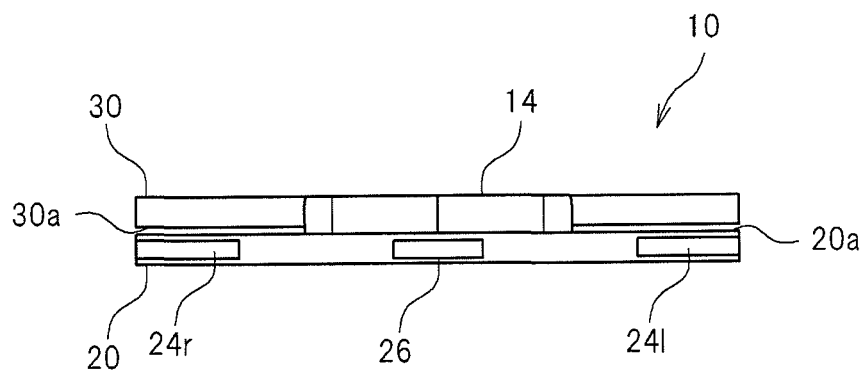
FIG. 2 is a rear elevation view showing external appearance of a game device according to an embodiment of the present invention.
Figure 3:
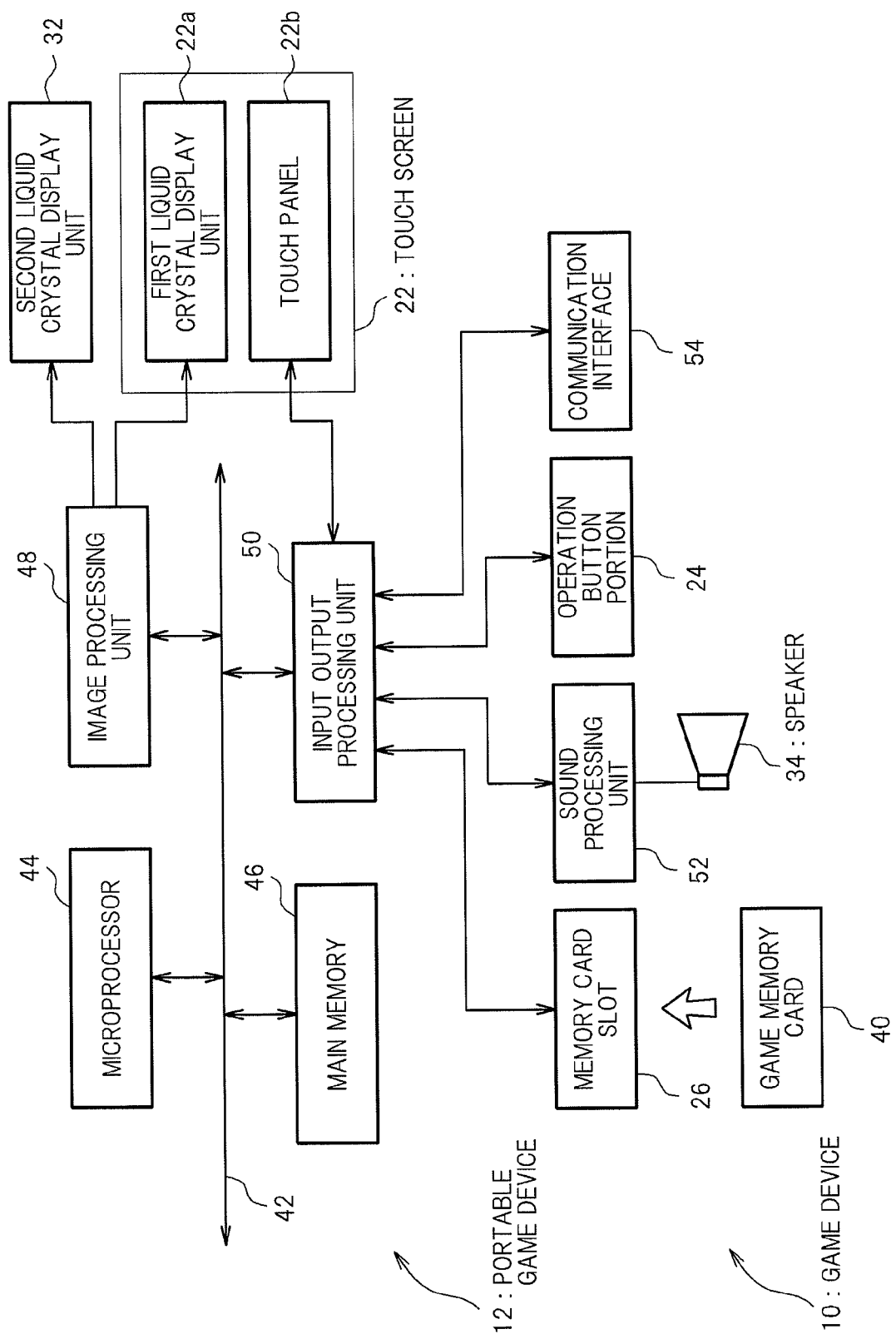
FIG. 3 is a diagram showing a hardware structure of a game device according to an embodiment of the present invention.

FIGS. 1 and 2 show external appearance of a game device 10 (portable game device 12) according to an embodiment of the present invention. FIG. 3 shows a hardware structure of a game device 10 according to this embodiment.

FIG. 1 is a perspective view of a game device 10 viewed from the forward direction thereof. As shown in FIG. 1, the game device 10 comprises a first enclosure 20 and a second enclosure 30. The first enclosure 20 and the second enclosure 30 are connected to each other via a hinge 14 so as to fold. A touch screen 22, a cross button 24c, and buttons 24a, 24b, 24x, 24y are provided on the front surface 20a of the first enclosure 20. The touch screen 22 includes a first liquid crystal display unit 22a and a touch panel 22b placed on the first liquid crystal display unit 22a (see FIG. 3). The cross button 24c is used for, for example, a direction designation operation, and the buttons 24a, 24b, 24x, 24y are used for various operations. A second liquid crystal display unit 32 is provided on the front surface 30a of the second enclosure 30. The second enclosure 30 incorporates a speaker 34.

FIG. 2 is a rear elevation view of the game device 10 in a folded position (with the front surface 20a of the first enclosure 20 and the front surface 30a of the second enclosure 30 being placed one on the other). As shown in FIG. 2, buttons 24l, 24r are provided on the respective left and right portions on the rear surface of the first enclosure 20, and a memory card slot 26 for accepting a game memory card 40 (see FIG. 3), or an information storage medium, is provided in the middle on the rear surface of the first enclosure 20.

As shown in FIG. 3, the game device 10 comprises a touch screen 22 (first liquid crystal display unit 22a and a touch panel 22b), an operation button portion 24, a memory card slot 26, a second liquid crystal display unit 32, a speaker 34, a bus 42, a microprocessor 44, a main memory 46, an image processing unit 48, an input output processing unit 50, a sound processing unit 52, and a communication interface 54.

The microprocessor 44 carries out various information processes, based on an operating system stored in a ROM (not shown) or a program stored in the game memory card 40. The main memory 14 comprises, e.g., a RAM, and a program read from the game memory card 40 is written into the main memory 46 when necessary. The main memory 46 is also used as a working memory of the microprocessor 44. The bus 42 is used to exchange an address and data among the respective units of the game device 10.

The first liquid crystal display unit 22a and the second liquid crystal display unit 32 are publicly known liquid crystal display panels. The image processing unit 48 includes a VRAM, and renders an image in the VRAM according to an instruction from the microprocessor 44. An image rendered in the VRAM is displayed on the first liquid crystal display unit 22a or the second liquid crystal display unit 32 at a predetermined time.

The input output processing unit 50 is an interface via which the microprocessor 44 exchanges data with the touch panel 22b, the operation button portion 24, the memory card slot 26, the sound processing unit 52, and the communication interface 54. The sound processing unit 52 includes a sound buffer, and outputs via the speaker 34 sound data read from the game memory card 40 to the sound buffer. The communication interface 54 is an interface for connecting to a communication network.

The operation button portion 24 is a means for receiving an operation input by a user. The operation button portion 24 includes a cross button 24c and buttons 24a, 24b, 24x, 24y, 24l, 24r. The input output processing unit 50 determines the state of respective units of the operation button portion 24 every constant period (e.g., every $1/60^{th}$ of a second), and sends to the microprocessor 44 via the bus 42 an operation signal describing the scanning result. The microprocessor 44 determines the content of an operation by a user, based on an operation signal.

The touch panel 22b also is a means for receiving an operation input by a user, specifically, an input concerning a position. The touch panel 22b supplies pressed position information in accordance with a position pressed by a user to the microprocessor 44 via the input output processing unit 50. The microprocessor 44 determines the position pressed by a user, based on the pressed position information.

The memory card slot 26 reads a game program and game data recorded in the game memory card 40. The game memory card 40 includes a ROM where a game program and game data are stored and an EEPROM where game data such as, e.g., save data, or the like, is stored.

Note that although the game memory card 40 is used here to provide a game program and game data to the game device 10, any other information storage medium, e.g., an optical disk, or the like, may be used instead. Further, a game program and game data may be supplied from a remote place to the game device 10 via a communication network such as the Internet, or the like.

In the game device 10, e.g., a soccer game imitating a soccer match between an operating team operated by a user and an opponent team operated by a computer is carried out. This soccer game is realized by executing a program recorded in the memory card 40. Alternatively, the opponent team may be operated by another user.

Figure 4:
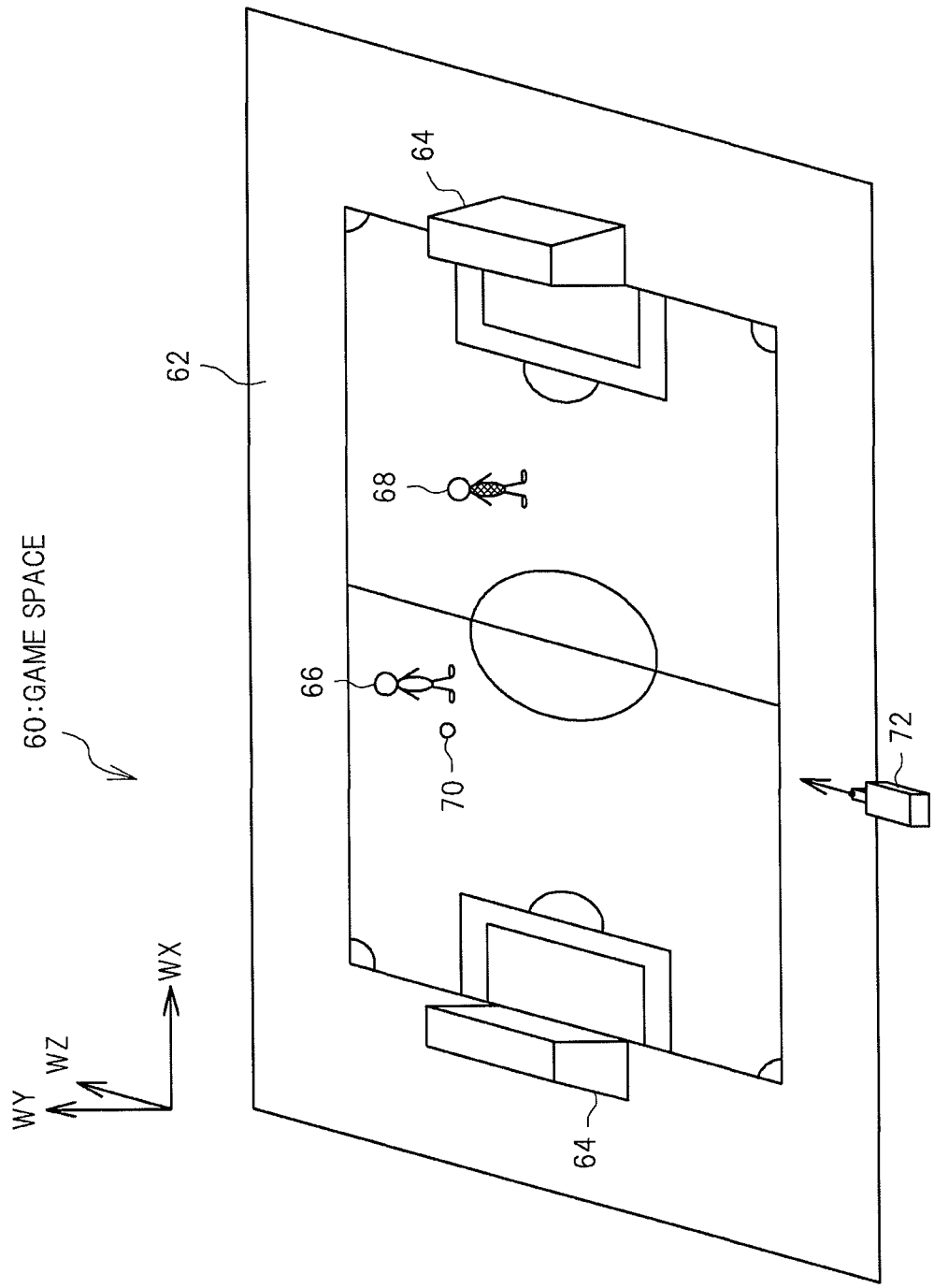
FIG. 4 is a diagram showing one example of a game space.

In order to realize a soccer game, a game space is created in the main memory 16. FIG. 4 shows one example of a game space. The game space 60 shown in FIG. 4 is a virtual three dimensional space. As shown in FIG. 4, a field 62, or an object representing a soccer field, is placed in the game space 60. On the field 62, a goal 64, or an object representing a soccer goal, a player character 66, or an object (game character) representing a soccer player belonging to the operating team, a player character 68, or an object (game character) representing a soccer player belonging to the opponent team, and the ball 70, or an object representing a soccer ball, are placed. The position of each object is managed according to a world coordinate system (a WX-WY-WZ coordinate system).

One of the goals 64 is correlated to the operating team, while the other is correlated to the opponent team. With the ball 70 having moved into a goal 64 correlated to either team, a score event occurs to the other team.

Although not shown in FIG. 4, eleven player characters 66 belonging to the operating team and eleven player characters 68 belonging to the opponent team are placed on the field 62. Note that when a player character 66 (68) and the ball 70 get closer to each other, the player character 66 (68) and the ball 70 are correlated to each other under a predetermined condition. In this case, the movement action of the player character 66 (68) is a dribble action. In the following, a situation in which the ball 70 is correlated to a player character 66 (68) will be described as "a player character 66 (68) holding the ball 70".

A virtual camera 72 (viewpoint) is set in the game space 60. A game screen image showing a picture obtained by viewing the game space 60 from the virtual camera 72 is displayed on the touch screen 22 (first liquid crystal display unit 22a). This game screen image is created by transforming the vertex coordinates in the world coordinate system, of each object placed in the game space 60 to those in the screen coordinate systems through a predetermined coordinate transformation operation. The screen coordinate system is a coordinate system using the upper right point of a game screen image as the origin O, the rightward direction as the X axial positive direction, and the descending direction as the Y axial positive direction (see FIG. 5 to be described later). Note that the virtual camera 72 moves in the game space 60, based on the position of the ball 70, such that, for example, the ball 70 is always shown in a game screen image.

Figure 5:
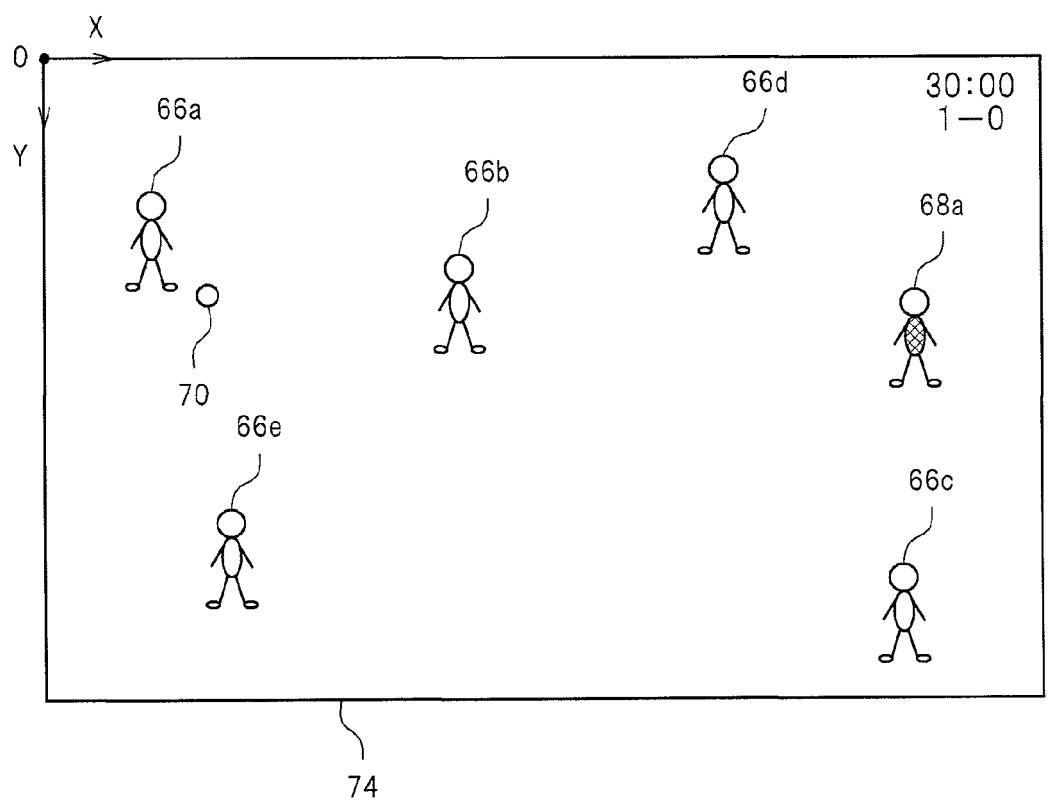
FIG. 5 is a diagram showing one example of a game screen image.

FIG. 5 shows one example of a game screen image. In the game screen image 74 shown in FIG. 5, player characters 66a, 66b, 66c, 66d, 66e belonging to the operating team and a player character 68a belonging to the opponent team are shown. In the situation shown in FIG. 5, the player character 66a holds the ball 70.

The respective player characters 66, 68 automatically act according to a predetermined action algorithm. A user, however, can instruct a player character 66 belonging to the operating team to pass. For example, in the situation shown in FIG. 5, a user selects the player character 66b to thereby instruct the player character 66a to pass to the player character 66b.

Figure 6:
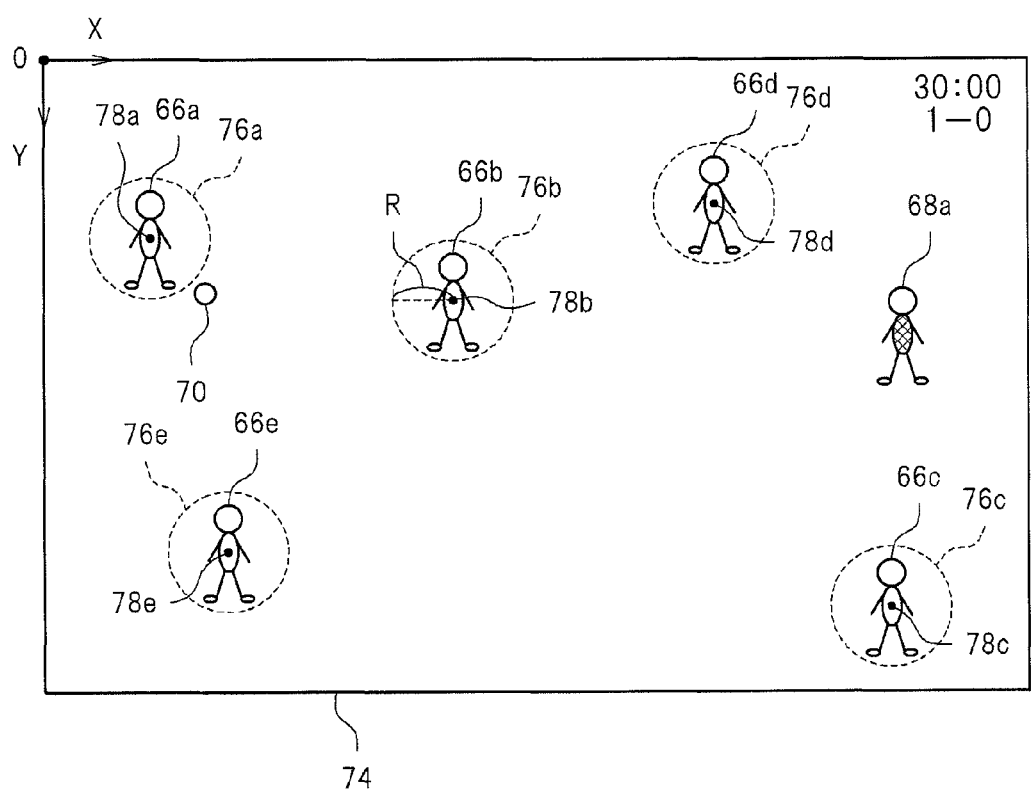
FIG. 6 is a diagram explaining one example of a determination area.

In this embodiment, a determination area is set for each of the player characters 66 belonging to the operating team. FIG. 6 is a diagram explaining a determination area, showing one example of the determination areas 76a, 76b, 76c, 76d, 76e set for the respective player characters 66a, 66b, 66c, 66d, 66e. The determination areas 76a, 76b, 76c, 76d, 76e are defined based on the positions of the player characters 66a, 66b, 66c, 66d, 66e. Specifically, the determination areas 76a, 76b, 76c, 76d, 76e are circular areas each having a radius R and the respective reference position 78a, 78b, 78c, 78d, 78e as the center. The reference positions 78a, 78b, 78c, 78d, 78e are defined in respective positions corresponding to the representative points of the respective player characters 66a, 66b, 66c, 66d, 66e.

The determination areas 76a to 76e and the reference positions 78a to 78e are managed according to the screen coordinate system. For example, the coordinate values (screen coordinate values) of the reference position 78a are obtained by transforming the world coordinate values of the representative point of the player character 66a into screen coordinate values through a coordinate transformation operation similar to that which is used in production of a game screen image 74. This is applicable to the reference positions 78b to 78e.

Note that the determination areas 76a to 76e will be hereinafter simply referred to as a "determination area 76" when not being discriminated. Similarly, the reference positions 78a to 78e will be hereinafter simply referred to as a "reference position 78".

For example, a user can select the player character 66b by pressing a position in the determination area 76b for the player character 66b. If the ball 70 is correlated to the player character 66a in the above, as shown in FIG. 6, it is possible to instruct the player character 66a to pass to the player character 66b.

In particular, in this embodiment, after a user selects the player character 66b (that is, a user instructs the player character 66a to pass to the player character 66b), the determination areas 76a, 76c to 76e for the respective player characters 66a, 66c to 66e are changed and remain so for a predetermined period (e.g., one second) so as to make it easier to select any of the player characters 66a, 66c to 66e belonging to the operating team as a pass receiver to receive a pass from the player character 66b.

Figure 7:
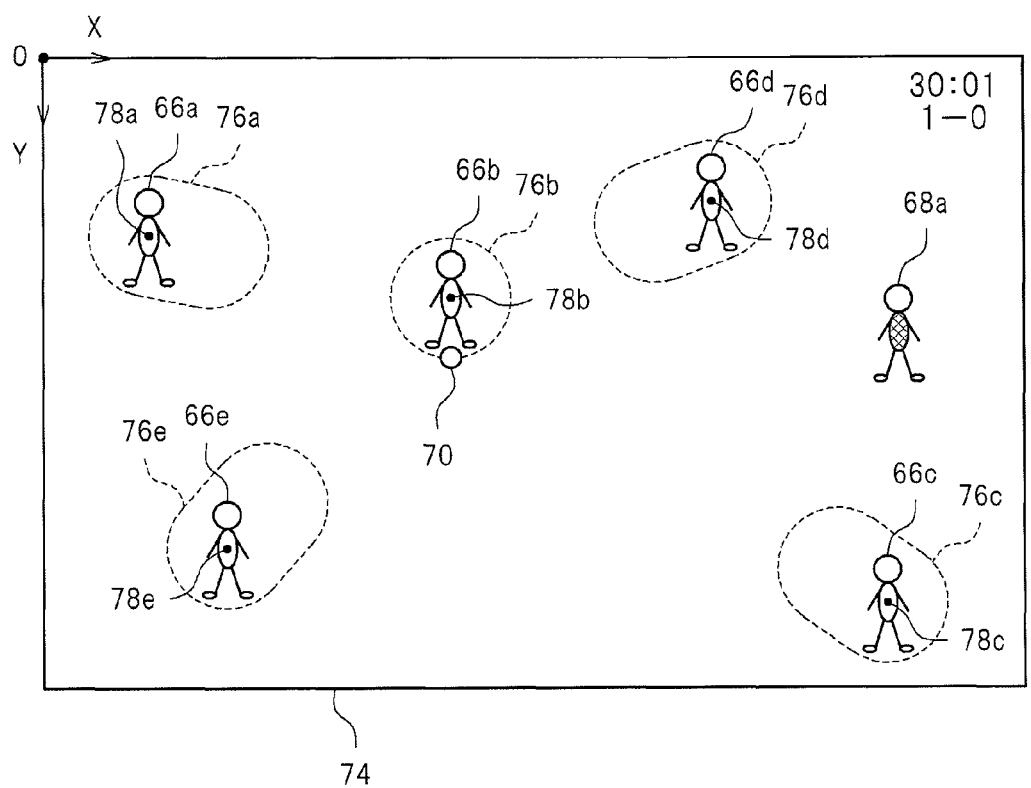
FIG. 7 is a diagram explaining one example of change of a determination area.

FIG. 7 is a diagram explaining change of a determination area 76, specifically, the determination areas 76a, 76c to 76e, with the player character 66b selected by a user. As shown in FIG. 7, the determination areas 76a, 76c to 76e are deformed so as to expand toward the player character 66b (determination area 76b, reference position 78b).

Figure 8:
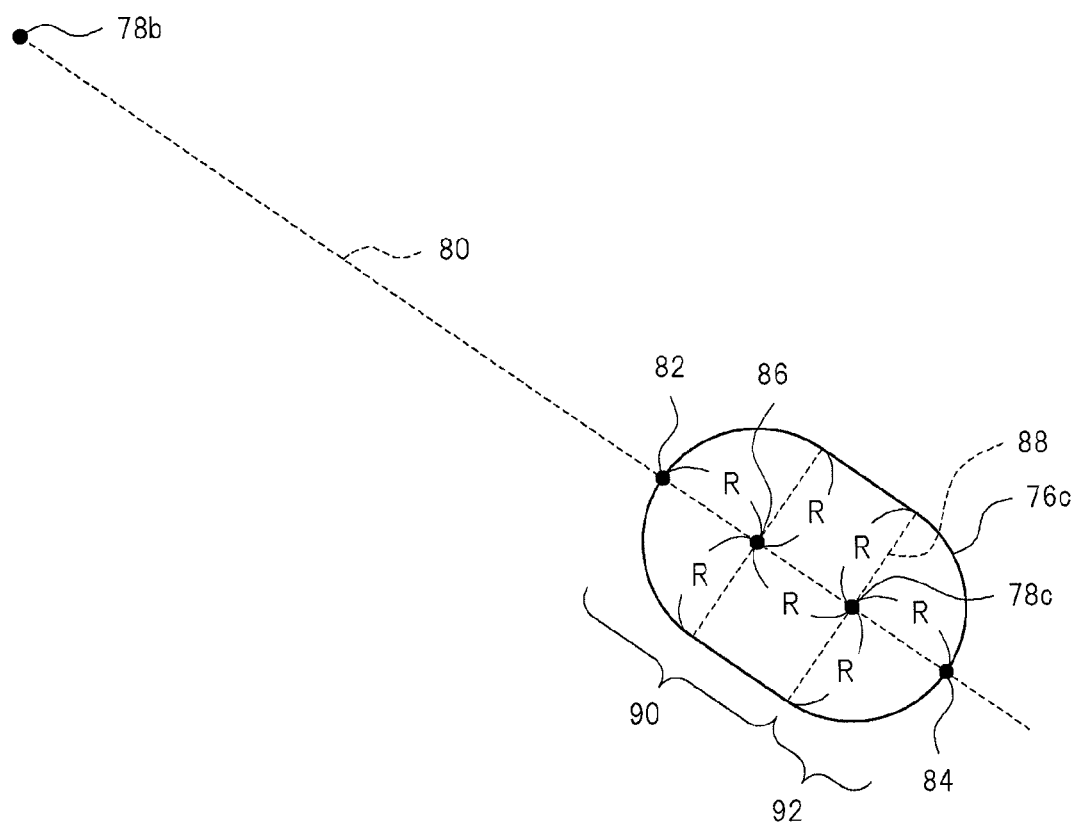
FIG. 8 is a diagram explaining one example of change of a determination area.

FIG. 8 is a diagram explaining details of deformation of a determination area 76, more particularly showing deformation of the determination area 76c. In FIG. 8, the straight line 80 includes a straight line extending from the reference position 78b toward the reference position 78c and an extension line thereof. The cross points 82, 84 are points where the boundary of the determination area 76c intersects the straight line 80, in which the cross point 82 is one closer to the determination area 76b (reference position 78b) and the cross point 84 is one farther from the determination area 76b (reference position 78b). A point 86 is located on the straight line 80, being displaced from the reference position 78c toward the reference position 78b by a distance R.

As shown in FIG. 8, the determination area 76c is deformed so as to expand from the reference position 78c toward the reference position 78b. The determination area 76c shown in FIG. 8 is identical to an area where the circular area having the radius R will pass when the central point of the circular area moves on the straight line 80 from the reference position 78c to the point 86.

In the example shown in FIG. 8, the distance between the reference position 78c and the cross point 82 is 2*R, while the distance between the reference position 78c and the cross point 84 remains R. That is, the determination area 76c is deformed such that the distance between the reference position 78c and the cross point 82 is resultantly longer than the distance between the reference position 78c and the cross point 84.

In the example shown in FIG. 8, when the determination area 76c is halved into two areas 90, 92 by the straight line 88 vertically intersecting the straight line 80 and passing through the reference position 78c, the area 90 located closer to the reference position 78b is resultantly larger than the area 92 located farther from the reference position 78b. That is, the determination area 76c is deformed such that the area 90 is resultantly larger than the area 92.

Here, assume a case in which a user presses a position in the determination area 76b in, for example, the situation shown in FIG. 6 to thereby instruct the player character 66a to pass to the player character 66b and immediately thereafter presses a position in the determination area 76c to thereby instruct the player character 66b to pass to the player character 66c. In this case, a user tends to press a position closer to the player character 66b, which is selected immediately before (that is, a position closer to the determination area 76b pressed immediately before). That is, the position pressed by a user may be located relatively far from the player character 66c (determination area 76c). In this case, the position pressed by a user may possibly be outside the determination area 76c if the determination area 76c for the player character 66c is a circular area such as is shown in FIG. 6. As a result, selection of the player character 66c may fail.

Regarding this point, as the determination area 76c is deformed so as to expand toward the player character 66b (determination area 76b, reference position 78b) in the game device 10, as shown in FIGS. 7 and 8, even if the position pressed by a user is located closer to the player character 66b (determination area 76b) and accordingly relatively far from the player character 66c (determination area 76c), the position pressed by the user is still highly likely to be included in the determination area 76c. As a result, selection of the player character 66c may rarely fail.

In addition, as the determination area 76c is deformed so as to expand toward the player character 66b (determination area 76b, reference position 78b) and the boundary of the determination area 76c is accordingly located closer to the boundary of the determination area 76b, a user can move their finger or a touch pen by only a shorter distance in order to press a position in the determination area 76c immediately after pressing a position in the determination area 76b. This makes it easier for a user to successively press a position in the determination area 76b and then a position in the determination area 76c. That is, a user can readily achieve successive selection of the player character 66b and then the player character 66c.

Note that as the determination areas 76a, 76d, 76e are deformed similarly to the determination area 76c, a user can readily achieve successive selection of the player character 66b and then the player character 66a, 66d, or 66e.

Figures 9, 10, 11:
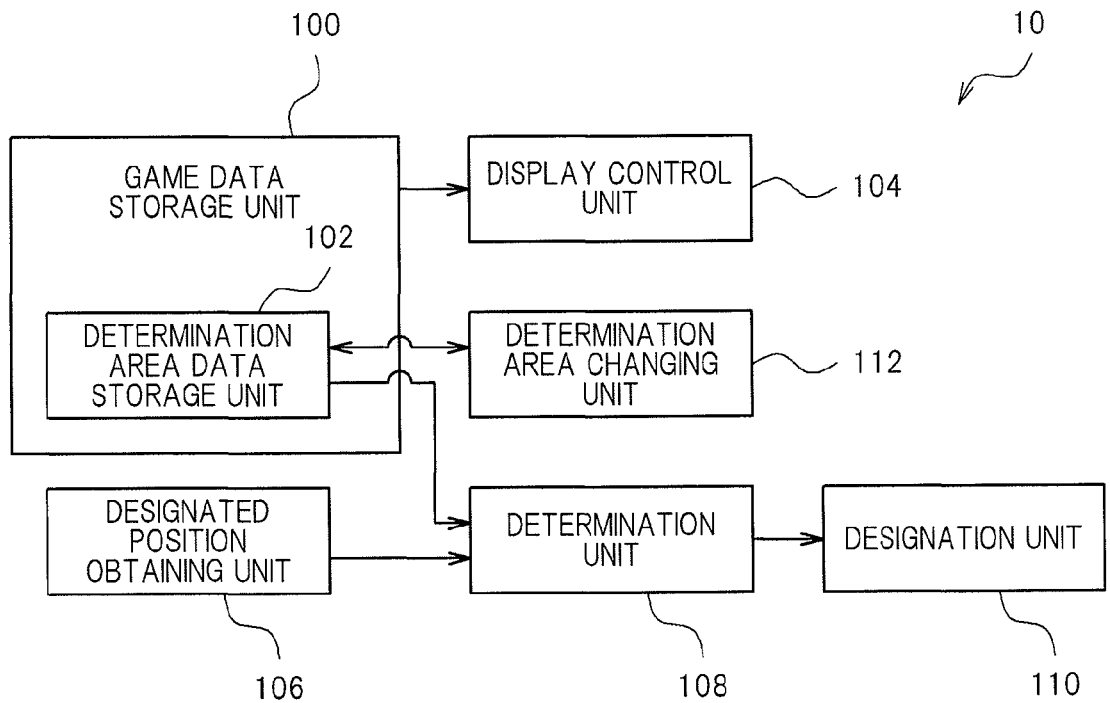
FIG. 9 is a functional block diagram of a game device according to an embodiment of the present invention.
FIG. 10 is a diagram showing one example of determination area list data.
FIG. 11 is a diagram showing one example of deforming direction specifying data.

FIG. 9 is a functional block diagram showing functions realized in the game device 10. As shown in FIG. 9, the game device 10 comprises a game data storage unit 100, a display control unit 104, a designated position obtaining unit 106, a determination unit 108, a designation unit 110, and a determination area changing unit 112. The game data storage unit 100 is realized, using, for example, the game memory card 40 or the main memory 46, while the other function blocks are realized by the microprocessor 44 executing a program read from the game memory card 40.

The game data storage unit 100 stores data necessary for realizing a soccer game. For example, game situation data describing the current situation of a soccer game is stored in the game data storage unit 100. The game situation data includes, for example, the data below:

(1) data describing the current condition (position, posture, moving direction, moving speed, and so forth) of each player character 66, 68;
(2) data describing the current condition (position, moving direction, moving speed, and so forth) of the ball 70;
(3) data on a player character 66 (68) holding the ball 70;

(4) data on the current condition (position, viewing direction, and so forth) of the virtual camera 72;
(5) data describing the scores of both teams;
(6) data describing the elapsed period of time.

The game data storage unit 100 includes a determination area data storage unit 102. The determination area data storage unit 102 stores data specifying one or more determination areas 76 currently set in a game screen image 74. FIGS. 10 and 11 show one example of data stored in the determination area data storage unit 102.

FIG. 10 shows one example of determination area list data concerning a list of determination areas 76 currently set in a game screen image 74. The determination area list data shown in FIG. 10 includes "player ID", "reference position", and "deformation flag" fields.

In the "player ID" field, the player ID of a player character 66 corresponding to a determination area 76 is stored. Note that the content of the determination area list data shown in FIG. 10 concerns the situation shown in FIG. 7. The player ID "A" is for the player character 66a shown in FIG. 7. Similarly, player ID's "B", "C", "D", "E" are for the respective player characters 66b, 66c, 66d, 66e shown in FIG. 7.

In the "reference position" field, the coordinates (screen coordinates) of the reference position 78 of a determination area 76 are stored. In the "deformation flag" field, a deformation flag indicating whether or not a determination area 76 is deformed is stored. A deformation flag takes a value of "0" or "1". The value "0" indicates that a determination area 76 is not deformed. That is, similar to the determination areas 76a to 76e shown in FIG. 6, a determination area 76 having a deformation flag set to the value "0" is a circular area having the radius R and the reference position 78 as the center. Meanwhile, the value "1" indicates that a determination area 76 is deformed. That is, a determination area 76 having a deformation flag set to the value "1" is deformed similarly to the determination areas 76a, 76c to 76e shown in FIG. 7.

FIG. 11 shows one example of deforming direction specifying data specifying a direction in which a determination area 76 is deformed. Specifically, as the determination areas 76a, 76c to 76e are expanded toward the reference position 78b in the situation shown in FIG. 7, the coordinates (screen coordinates) of the reference position 78b are stored as data specifying a deforming direction (that is, the direction toward the reference position 78b) of each of the determination areas 76a, 76c to 76e.

The display control unit 104 shows a plurality of selected image candidates on the touch screen 22 (first liquid crystal display unit 22a). Specifically, in this embodiment, the display control unit 104 shows a game screen image 74 such as is shown in, e.g., FIG. 5 on the touch screen 22. In this embodiment, a player character 66 belonging to the operating team corresponds to a "selected image candidate".

The designated position obtaining unit 106 obtains a position designated by a user. In this embodiment, the designated position obtaining unit 106 obtains a position pressed by a user, based on the pressed position information output from the touch panel 22b.

The determination unit 108 determines whether or not the position obtained by the designated position obtaining unit 106 is included in any of the plurality of determination areas for a plurality of selected image candidates. In this embodiment, the determination unit 108 determines whether or not the position obtained by the designated position obtaining unit 106 is included in the determination area 76 for any player character 66.

When it is determined that the position obtained by the designated position obtaining unit 106 is included in the determination area for any selected image candidate, the designation unit 110 designates the selected image candidate as a selected image (an image selected by a user). In this case, for example, a process related to the selected image is carried out.

In this embodiment, when the position obtained by the designated position obtaining unit 106 is included in the determination area 76 for any player character 66, the designation unit 110 determines that the player character 66 is selected, and then designates the player character 66 as a selected player character (a player character 66 selected by a user). In this case, a process related to the selected player character 66 is carried out. For example, a process for causing the player character 66 holding the ball 70 to pass to the selected player character 66 is carried out.

Once the designation unit 110 designates any of the plurality of selected image candidates as a selected image, the determination area changing unit 112 changes the determination area for another selected image candidate among the plurality of selected image candidates, based on the positional relationship between the other selected image candidate or the determination area for the other selected image candidate and the selected image (that is, the selected image candidate designated as a selected image) or the determination area for the selected image.

In this embodiment, when it is determined that any player character 66 (hereinafter referred to as a "first player character 66") is selected, the determination area changing unit 112 changes the determination area 76 for another player character 66 (hereinafter referred to as a "second player character 66"), based on the positional relationship between the second player character 66 or the determination area 76 for the second player character 66 and the first player character 66 or the determination area 76 for the first player character 66.

To "change a determination area 76" includes, for example, to deform, to move, or to enlarge a determination area 76.

A "positional relationship between the second player character 66 or the determination area 76 for the second player character 66 and the first player character 66 or the determination area 76 for the first player character 66" includes, for example, the positional relationships mentioned below:
(1) positional relationship between the second player character 66 and the first player character 66;
(2) positional relationship between the determination area 76 for the second player character 66 and the determination area 76 for the first player character 66;
(3) positional relationship between the determination area 76 for the second player character 66 and the first player character 66; and
(4) positional relationship between the second player character 66 and the determination area 76 for the first player character 66.

A "positional relationship" refers to, for example, a direction, a distance, or the like.

That is, a "positional relationship between the second player character 66 or the determination area 76 for the second player character 66 and the first player character 66 or the determination area 76 for the first player character 66" refers to, for example, a direction from the second player character 66 or the determination area 76 for the second player character 66 to the first player character 66 or the determination area 76 for the first player character 66.

A "positional relationship between the second player character 66 or the determination area 76 for the second player character 66 and the first player character 66 or the determination area 76 for the first player character 66" refers to, for example, the distance between the second player character 66 or the determination area 76 for the second player character 66 and the first player character 66 or the determination area 76 for the first player character 66.

When it is determined that the player character 66b is selected (in other words, when the player character 66b is designated as a selected player character) in the situation shown in, for example, FIG. 6, the determination area changing unit 112 deforms the determination areas 76a, 76c to 76e for the respective player characters 66a, 66c to 66e other than the player character 66b.

In this case, for example, the determination area 76c is deformed based on the positional relationship between the reference position 78b of the determination area 76b (player character 66b) and the reference position 78c of the determination area 76c (player character 66c). Specifically, the determination area 76c is deformed so as to expand in the direction from the reference position 78c to the reference position 78b, as shown in FIGS. 7 and 8.

Figure 12:
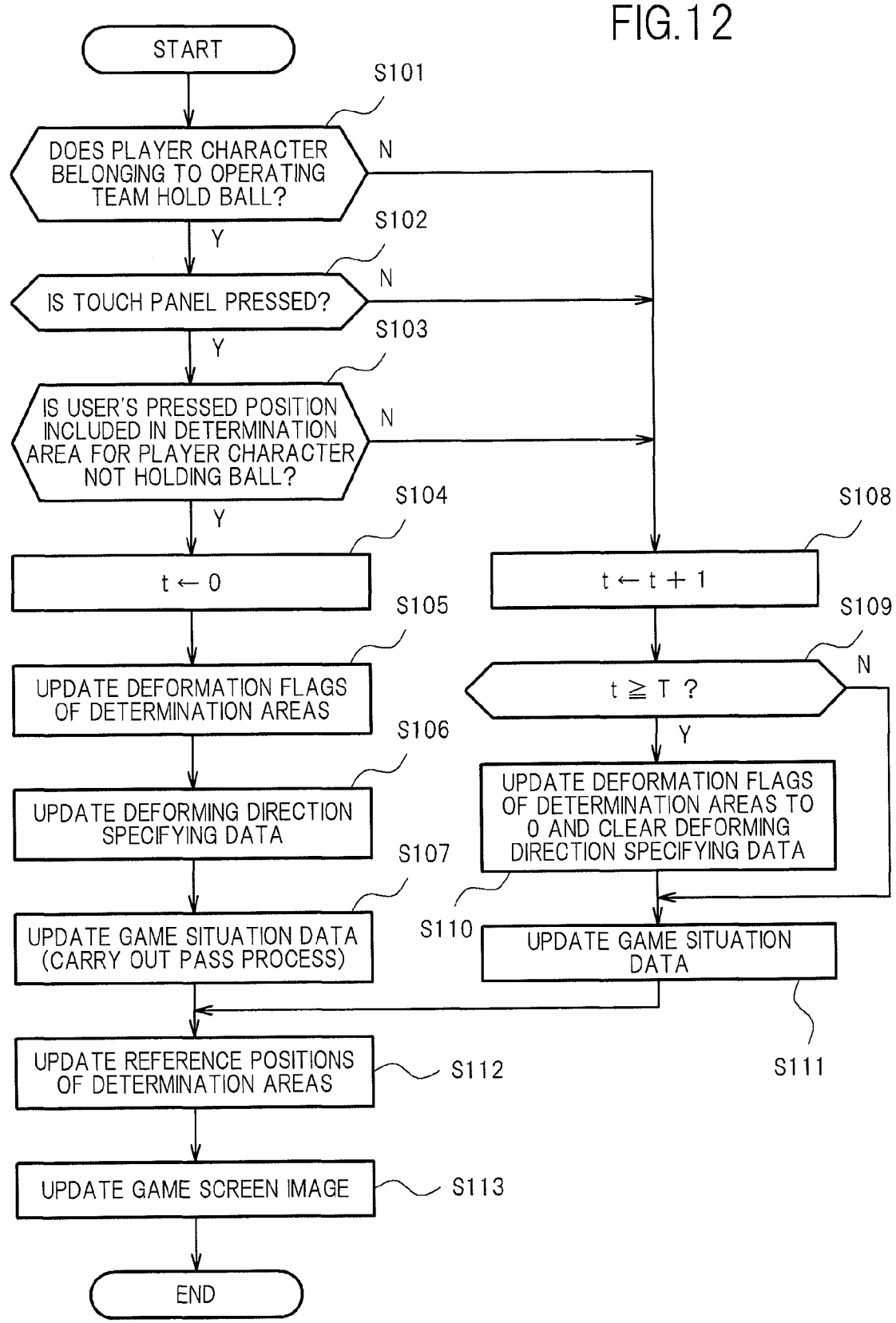
FIG. 12 is a flowchart of a process to be carried out in the game device.

Below, a process to be carried out by the game device 10 will be described. FIG. 12 shows a flowchart of a process to be carried out in the game device 10 every predetermined period of time (e.g., 1/60$^{th}$ of a second). The microprocessor 44 carries out the process shown in FIG. 12 according to a program read from the game memory card 40.

As shown in FIG. 12, the microprocessor 44 determines whether or not a player character 66 belonging to the operating team is holding the ball 70 (S101). When a player character 66 belonging to the operating team is holding the ball 70 (Y at S101), the microprocessor 44 determines whether or not the touch panel 22b has been pressed (S102).

When it is determined that the touch panel 22b has been pressed (Y at S102), the microprocessor 44 (designated position obtaining unit 106) obtains the position pressed by a user (screen coordinate values). Then, the microprocessor 44 (determination unit 108) determines whether or not the position pressed by a user is included in the determination area 76 for any player character 66 not holding the ball 70 (S103).

At S103, the determination area list data and the deforming direction specifying data are read, and a determination area 76 for a "player character 66 shown in a game screen image 74 and not holding the ball 70" is specified based on the data read. Note that a player character 66 not holding the ball 70 is specified based on the game situation data.

When it is determined that the position pressed by a user is included in the determination area 76 for any player character 66 not holding the ball 70 (Y at S103), the microprocessor 44 (designation unit 110) determines that the player character 66 is selected as a pass receiver, and then carries out the process described below (S104 to S107). Note that, in the description below, a player character 66 (selected player character) selected as a pass receiver is referred to as a "player character X" and the determination area 76 for the player character X, that is, a determination area 76 determined as including a position pressed by a user, is referred to as a "determination area X".

Initially, the microprocessor 44 initializes the variable t to 0 (S104). The variable t is used to determine whether or not a period of time has elapsed after a position in any determined area 78 was pressed (in other words, a period of time elapsed after any player character 66 was selected as a pass receiver) has reached a predetermined period (one second in this embodiment).

Then, the microprocessor 44 (determination area changing unit 112) updates the deformation flags of the respective determination areas 76 (S105). Specifically, the deformation flag of the determination area 76 for the player character X is set to "0", and those for other player characters 66 are set to "1".

Further, the microprocessor 44 (determination area changing unit 112) updates the deforming direction specifying data (S106). Specifically, the reference position 78 of the determination area X at the present moment is stored as new deforming direction specifying data.

Thereafter, the microprocessor 44 updates the game situation data (S107). For example, condition (position, posture, and so forth) of each player character 66, 68 and the ball 70 is updated at S107. In particular, a process (a pass process) for causing the player character 66 holding the ball 70 to pass to the player character X is carried out at S107. Specifically, the posture of the player character 66 holding the ball 70 is updated such that the player character 66 holding the ball 70 carries out a pass action. In addition, the position of the ball 70 is updated such that the ball 70 moves toward the player character X. Further, action control is carried out with respect to other player characters 66, 68 according to a predetermined action control algorithm at S107 to update the position, posture, and so forth, of the player characters 66, 68.

Note that when it is determined at S101 that no player character 66 belonging to the operating team is holding the ball 70 (N at S101), the process described below (S108 to S111) is carried out. Further, also when it is determined at S102 that the touch panel 22b is not pressed (N at S102) or it is determined at step 103 that the position pressed by a user is not included in the determination area 76 for a player character 66 not holding the ball 70 (N at S103), the process described below (S108 to S111) is carried out.

Initially, the microprocessor 44 adds one to the value of the variable t (S108), and then determines whether or not the value of the variable t is equal to or larger than a constant T (60 in this embodiment) (S109). A variable t having a value equal to or larger than a constant T means that a period of time having elapsed after any position in the determination area 76 was pressed (in other words, a period of time having elapsed after any player character 66 was selected as a pass receiver) has reached T/60$^{th}$ seconds or longer.

When the value of the variable t is equal to or larger than the constant T (Y at S109), the microprocessor 44 updates the deformation flags of the respective determination areas 76 to "0", and clears the deforming direction specifying data (S110). In this case, a state with all determination areas 76 not deformed, such as is shown in FIG. 6, for example, is restored.

After the process at S108 to S110, the microprocessor 44 updates the game situation data (S111). For example, at S111, condition (position, posture, and so forth) of each of the player characters 66, 68 is updated such that the player character 66, 68 acts according to a predetermined action control algorithm. In addition, condition (position and so forth) of the ball 70 is updated.

After the process at S107 or S111, the microprocessor 44 updates the reference positions 78 of the respective determination areas 76 held in the determination area list data (S112). At S112, the reference position 78 of each determination area 76 is updated based on the position of the player character 66, the position updated in the process at S107 or S111.

Note that at S112, when there is a player character 66 having moved from inside to outside the game screen image 74, a record corresponding to the player character 66 is deleted from the determination area list data. Meanwhile, when there is a player character 66 having moved from outside to inside the game screen image 74, a record corresponding to the player character 66 is added to the determination area list data. When the value of the variable t is smaller than the constant T, the value to be held in the "deforming direction" field, of the record to be added is set to "1", and when the value of the variable t is equal to or larger than the constant T, the value to be held in the "deforming direction" field, of the record to be added is set to "0".

After the process at S112, the microprocessor 44 (display control unit 104) updates the game screen image 74 (S113). The game screen image 74 is updated based on the game situation data. With the above, the process is terminated.

According to the above described game device 10, when a user successively selects a player character 66 and then another player character 66 (that is, when a user successively presses a position in a determination area 76 and then a position in another determination area 76), a user can hardly fail to select a player character 66, and in fact can readily select a player character 66.

Note that the present invention is not limited to the above-described embodiments.

First Modified Example

In the situation shown in FIG. 7, for example, the determination area changing unit 112 may control the degree of change (deformation) of the determination areas 76a, 76c to 76e, based on the distance between the respective determination area (or the player character 66 corresponding to the respective determination area 76) and the determination area 76b (or the player character 66b). For example, control may be made such that a longer distance between the respective determination area 76 and the determination area 76b results in a larger degree of change (deformation).

Figure 13:
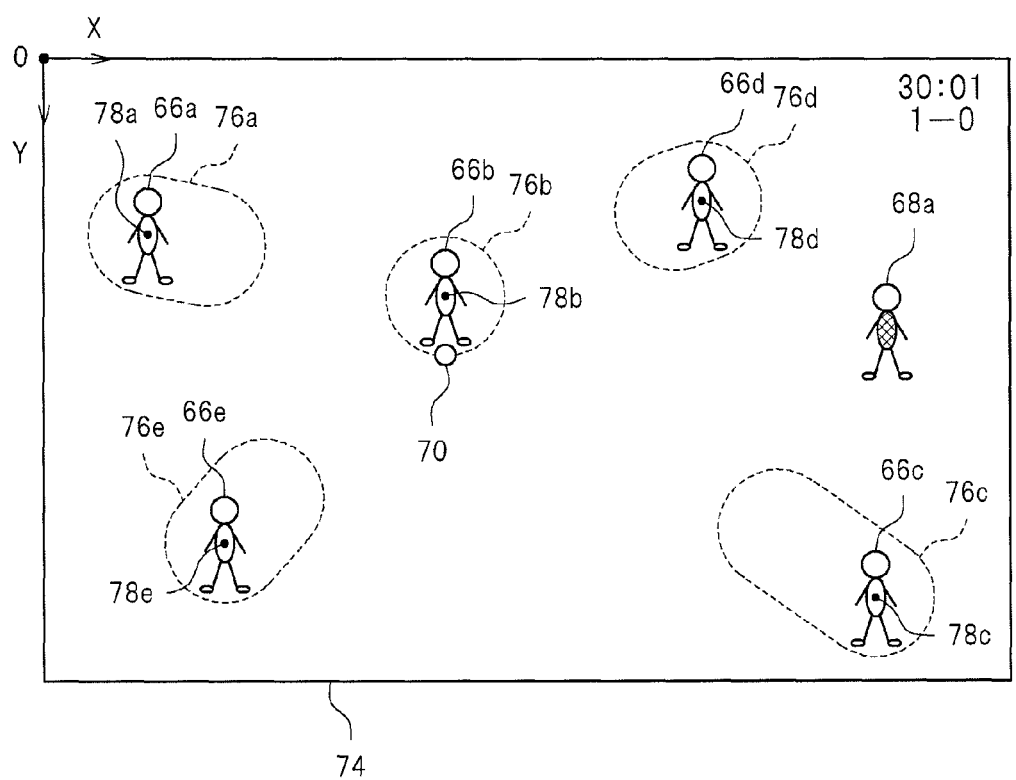
FIG. 13 is a diagram explaining one example of change of a determination area in a first modified example.

FIG. 13 shows one example of change of a determination area 76 (determination areas 76a, 76c to 76e). In FIG. 13, for example, as the distance between the reference position 78c of the determination area 76c (player character 66c) and the reference position 78b of the determination area 76b (player character 66b) is longer than the distance between the reference position 78a of the determination area 76a (player character 66a) and the reference position 78b, a larger degree of expansion results for the determination area 76c than that for the determination area 76a.

Here, assume a case in which, e.g., a user presses a position in the determination area 76b in the situation shown in FIG. 6 to thereby instruct the player character 66a to pass to the player character 66b and immediately thereafter presses a position in the determination area 76c to thereby instruct the player character 66b to pass to the player character 66c.

In this case, as a user tends to press a position closer to the player character 66b (that is, the determination area 76b pressed immediately therebefore), which is selected immediately therebefore, the position pressed by the user may resultantly be located relatively far from the determination area 76c (player character 66c). In particular, when the distance between the determination area 76b (player character 66b) and the determination area 76c (player character 66c) is longer, the position pressed by a user is more likely to be located far from the determination area 76c (player character 66c).

Regarding this point, according to the first modified example, a longer distance between the determination area 76c (player character 66c) and the determination area 76b (player character 66b) results in a larger degree of expansion of the determination area 76c. As a result, even when the position pressed by a user is located closer to the determination area 76b (player character 66b) and accordingly a relatively longer distance results between the position pressed by a user and the determination area 76c (player character 66c), the position pressed by the user is still highly likely to be included in the determination area 76c.

According to the first modified example, a user, when successively pressing a position in the determination area 76b and then a position in the determination area 76c, can move their finger or a touch pen by only a shorter distance. As a result, a user can readily achieve successive selection of the player character 66b (pressing a position in the determination area 76b) and the player character 66c (pressing a position in the determination area 76c).

Second Modified Example

When a user presses a position in the determination area 76b for the player character 66b in the situation shown in FIGS. 5 and 6, for example, the determination area changing unit 112 may move, rather than deform, the determination areas 76a, 76c to 76e for the respective player characters 66a, 66c to 66e toward the determination area 76b (or the player character 66b).

Figure 14:
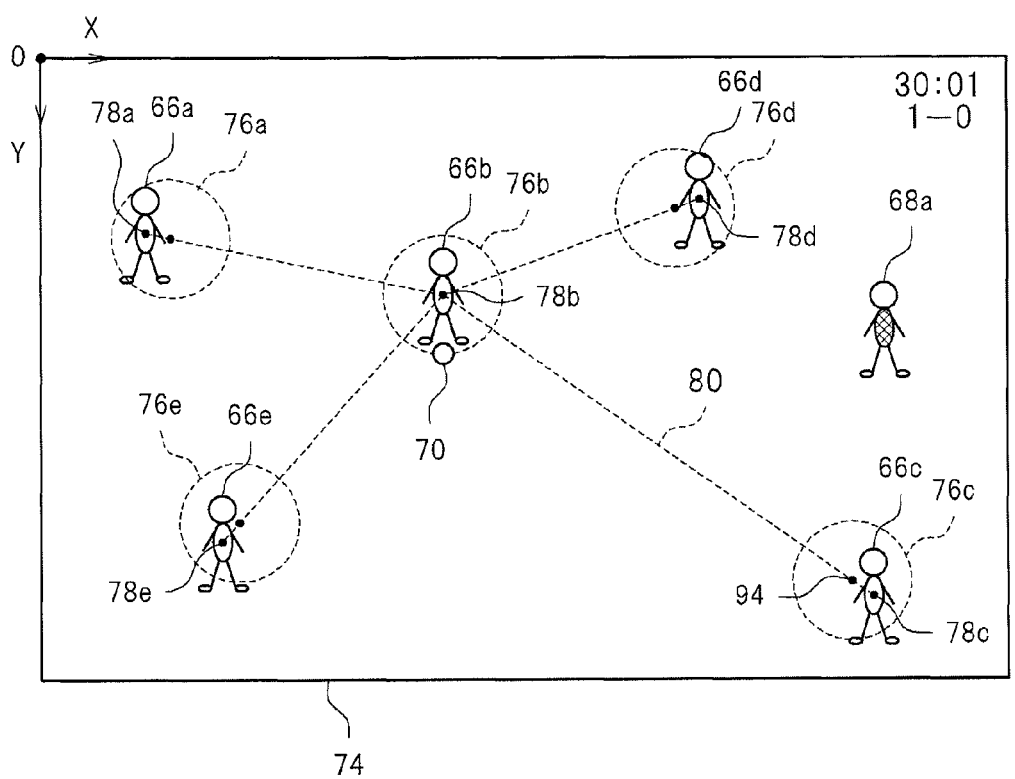
FIG. 14 is a diagram explaining one example of change of a determination area in a second modified example.

FIG. 14 shows one example of change of the determination area (determination areas 76a, 76c to 76e). In FIG. 14, the determination areas 76a, 76c to 76e are moved toward the determination area 76b (player character 66b). For example, the central point 94 of the determination area 76c is located on the straight line 80, displaced on the straight line 80 from the reference position 78c (the original central point) of the determination area 76c (player character 66c) toward the reference position 78b of the determination area 76b (player character 66b) by a predetermined distance.

In the second modified example, for example, the determination area 76c is moved to get closer to the determination area 76b (player character 66b). As a result, even when the position pressed by a user is located closer to the determination area 76b (player character 66b) and accordingly relatively far from the determination area 76c (player character 66c), the position pressed by a user is still highly likely to be included in the determination area 76c.

In the second modified example, as the boundary of the determination area 76b is located closer to that of the determination area 76c, a user can move their finger or a touch pen by only a shorter distance when successively pressing a position in the determination area 76b and then a position in the determination area 76c. As a result, a user can readily achieve successive selection of the player character 66b (pressing a position in the determination area 76b) and then the player character 66c (pressing a position in the determination area 76c).

Note that the movement distance of the determination areas 76a, 76c to 76e may be controlled based on the distance between the respective determination area 76 (or the player character 66 corresponding to the respective determination area 76) and the determination area 76b (or the player character 66b). For example, the distance between the reference position 78c of the determination area 76c (player character 66c) and the reference position 78b of the determination area 76b (player character 66b) is longer than the distance between the reference position 78a of the determination area 76a (player character 66a) and the reference position 78b, a longer moving distance may result for the determination area 76c than for the determination area 76a.

Third Modified Example

When a user presses a position in the determination area 76b for the player character 66b in the situation shown in FIGS. 5 and 6, for example, the determination area changing unit 112 may enlarge, rather than deform, the determination areas 76a, 76c to 76e for the respective player characters 66a, 66c to 66e.

The determination area changing unit 112 may control the degree of enlargement of the determination areas 76a, 76c to 76e, based on the distance between the respective determination area (or the player character 66 corresponding to the respective determination area 76) and the determination area 76b (or the player character 66b). For example, control may be made such that a longer distance between the respective determination area 76 and the determination area 76b results in a larger degree of enlargement.

Figure 15:
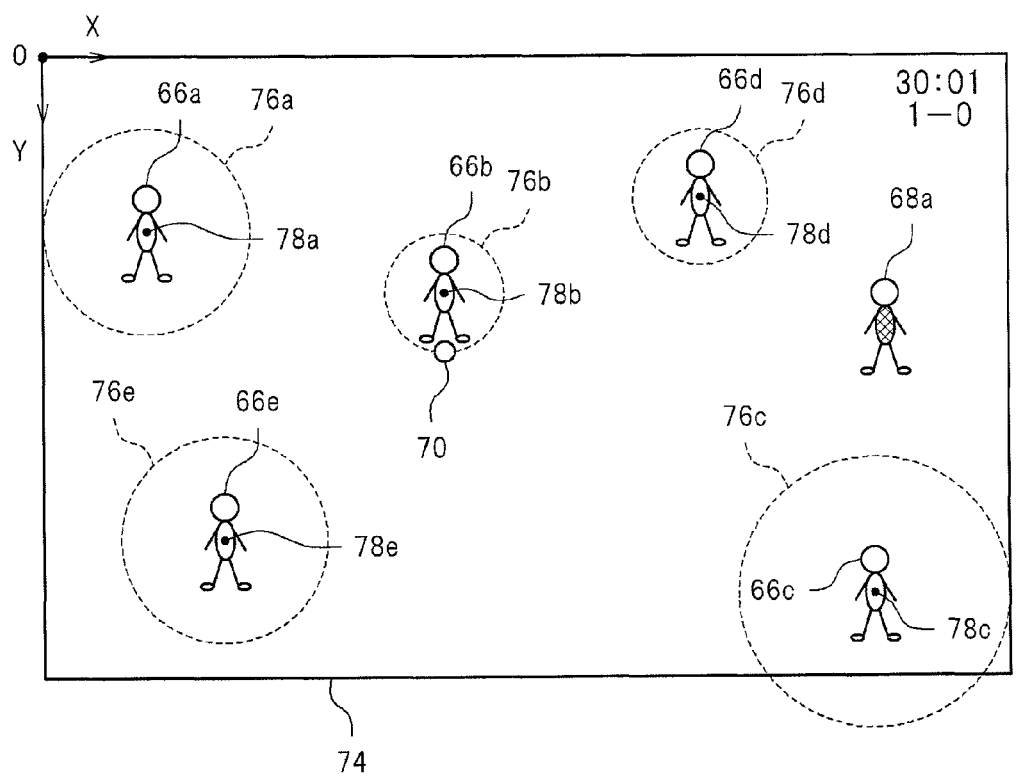
FIG. 15 is a diagram explaining one example of change of a determination area in a third modified example.

FIG. 15 shows one example of change of a determination area 76 (determination areas 76a, 76c to 76e). In FIG. 15, for example, as the distance between the reference position 78c of the determination area 76c (player character 66c) and the reference position 78b of the determination area 76b (player character 66b) is longer than the distance between the reference position 78a of the determination area 76a (player character 66a) and the reference position 78b, the determination area 76c is resultantly larger than the determination area 76a.

According to the third modified example, similar to the first modified example, for example, even when the position pressed by a user is located closer to the determination area 76b (player character 66b) and accordingly a relatively longer distance results between the position pressed by the user and the determination area 76c (player character 66c), the position pressed by the user is still highly likely to be included in the determination area 76c.

According to the third modified example, similar to the first modified example, when a user successively presses a position in the determination area 76b and then a position in the determination area 76c, the user can move their finger or a touch pen by only a shorter distance. This makes it easier for a user to successively select the player character 66b (pressing a position in the determination area 76b) and then the player character 66c (pressing a position in the determination area 76c).

Fourth Modified Example

Figures 16, 17:
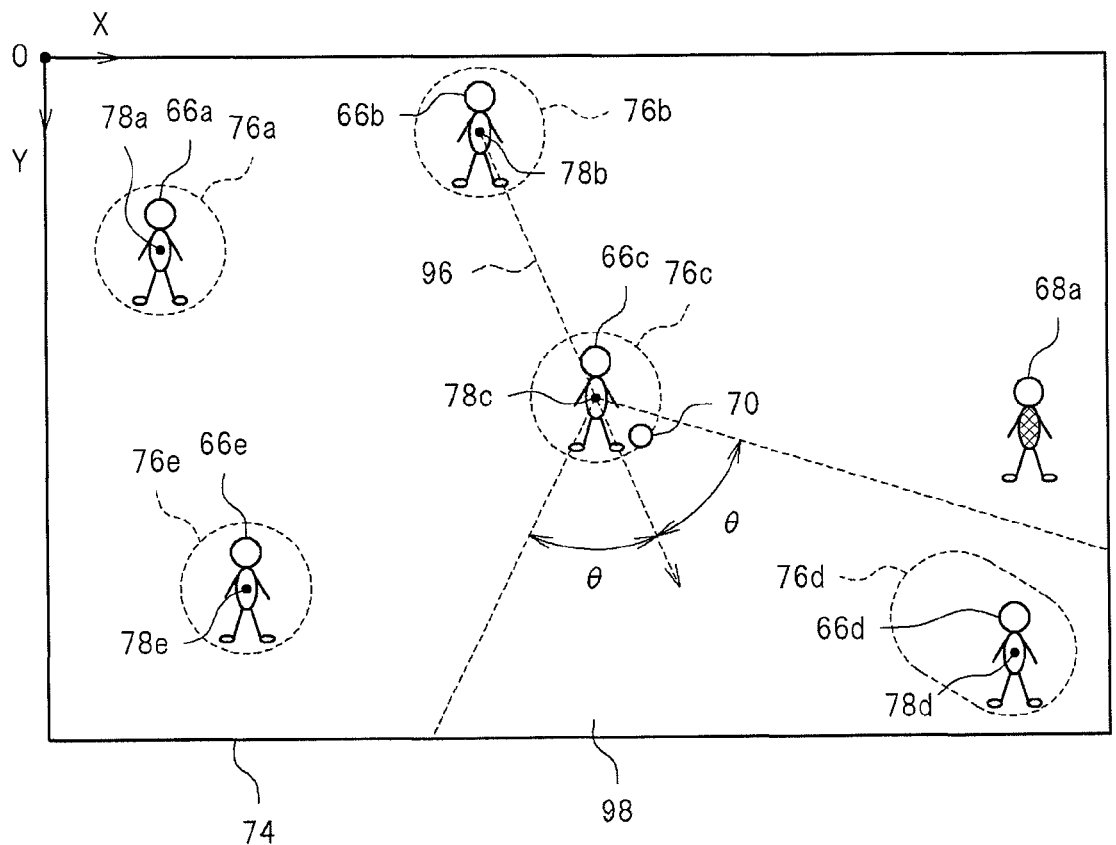
FIG. 16 is a diagram explaining one example of change of a determination area in a fourth modified example.
FIG. 17 is a diagram showing one example of cooperation parameter data.

For example, the determination area changing unit 112 may change only some of the determination areas 76 rather than all of the determination areas 76. FIG. 16 is a diagram explaining a fourth modified example, specifically explaining change of a determination area 76.

FIG. 16 shows a situation in which after the player character 66b is selected as a pass receiver to receive a pass from the player character 66a by a user by pressing a first position in the determination area 76b, the player character 66c is selected as a pass receiver to receive a pass from the player character 66b by a user by pressing a second position in the determination area 76c, and a pass to the player character 66c is thereafter carried out. That is, FIG. 16 shows a situation in which the designation unit 110 designates the player character 66b (second selected image candidate) as a selected player character (selected image) and then also designates the player character 66c (first selected image candidate) as a selected player character (selected image).

In this case, the determination area changing unit 112 (selection means) selects at least one determination area 76, based on the positional relationship between the player character 66b (or the determination area 76b), selected immediately before selection of the player character 66c, and the player character 66c (or the determination area 76c). For example, as shown in FIG. 16, a determination area 76 (player character 66) located within an area 98 having an angle equal to or smaller than a reference angle θ relative to the direction from the reference position 78b of the player character 66b (determination area 76b) to the reference position 78c of the player character 66c (determination area 76c) is selected.

Then, the determination area changing unit 112 changes the determination area 76 selected. In the case shown in FIG. 16, as the determination area 76d (player character 66d) is located within the area 98, the determination area 76d is selected, and only the determination area 76d is changed. That is, the determination area 76d is deformed based on the positional relationship between the reference position 78d of the determination area 76d (player character 66d) and the reference position 78c of the determination area 76c (player character 66c).

For example, in the situation shown in FIG. 16, when a user presses a first position in the determination area 76b to thereby select the player character 66b as a pass receiver to receive a pass from the player character 66a, and thereafter successively presses a second position in the determination area 76c to thereby select the player character 66c as a pass receiver to receive a pass from the player character 66b, it is expected, based on the positional relationship between the player character 66b and the player character 66c, that the user is highly likely to select the player character 66d. That is, it is highly expected that the user will press a position in the determination area 76d.

Regarding this point, according to the fourth modified example, only the determination area 76 which is highly expected to be pressed by a user is changed. While a relatively large process load is imposed in changing a determination area 76, compared to an otherwise case, a process load can be reduced in the fourth modified example as only a determination area 76 which is highly expected to be pressed by a user is changed.

Fifth Modified Example

For example, when a user presses a position in the determination area 76b for the player character 66b (first game character) in the situation shown in FIGS. 5 and 6, the determination areas 76a, 76c to 76e for the respective player characters 66a, 66c to 66e may be changed based on the relationship (e.g., degree of cooperation or degree of chemistry) between the player character (second game character) corresponding to the respective determination area 76 and the player character 66b.

In the fifth modified example, the game data storage unit 100 stores a parameter concerning the relationship (e.g., degree of cooperation or degree of chemistry) between the player characters 66, so as to be correlated to each combination of two player characters 66 belonging to the operating team. FIG. 17 shows one example of cooperation parameter data stored in the game data storage unit 100. The cooperation parameter data shown in FIG. 17 includes a "player character combination" field and a "cooperation parameter" field.

A "character combination" field shows a combination of the player ID's of two player characters 66 belonging to the operating team. In the "cooperation parameter" field, a cooperation parameter is stored. A cooperation parameter indicates the level of cooperation between two player characters 66. Specifically, the cooperation parameter takes values between 0 and 100, and a higher cooperation parameter value results in a higher degree of cooperation between two player characters 66.

When a user presses a position in the determination area 76b for the player character 66b in the situation shown in FIG. 6, the determination area changing unit 112 changes, for example, the determination area 76c for the player character 66c, based on the positional relationship between the determination area 76c (or the player character 66c) and the determination area 76b (or the player character 66b) and the cooperation parameter stored being correlated to the combination of the player character 66b and the player character 66c.

For example, the determination area changing unit 112 determines whether or not to change the determination area 76c for the player character 66c, based on the cooperation parameter stored being correlated to the combination of the player character 66b and the player character 66c. For example, when the cooperation parameter stored being correlated to the combination of the player character 66b and the player character 66c satisfies a predetermined condition, it is determined to change the determination area 76c. More specifically, when the cooperation parameter stored being correlated to the combination of the player character 66b and the player character 66c is equal to or larger than a predetermined reference value (e.g., 70), it is determined to change the determination area 76c.

When it is determined to change the determination area 76c, the determination area changing unit 112 changes the determination area 76c, based on the positional relationship between the reference position 78c of the determination area 76c (player character 66c) and the reference position 78b of the determination area 76b (player character 66b).

Figure 18:
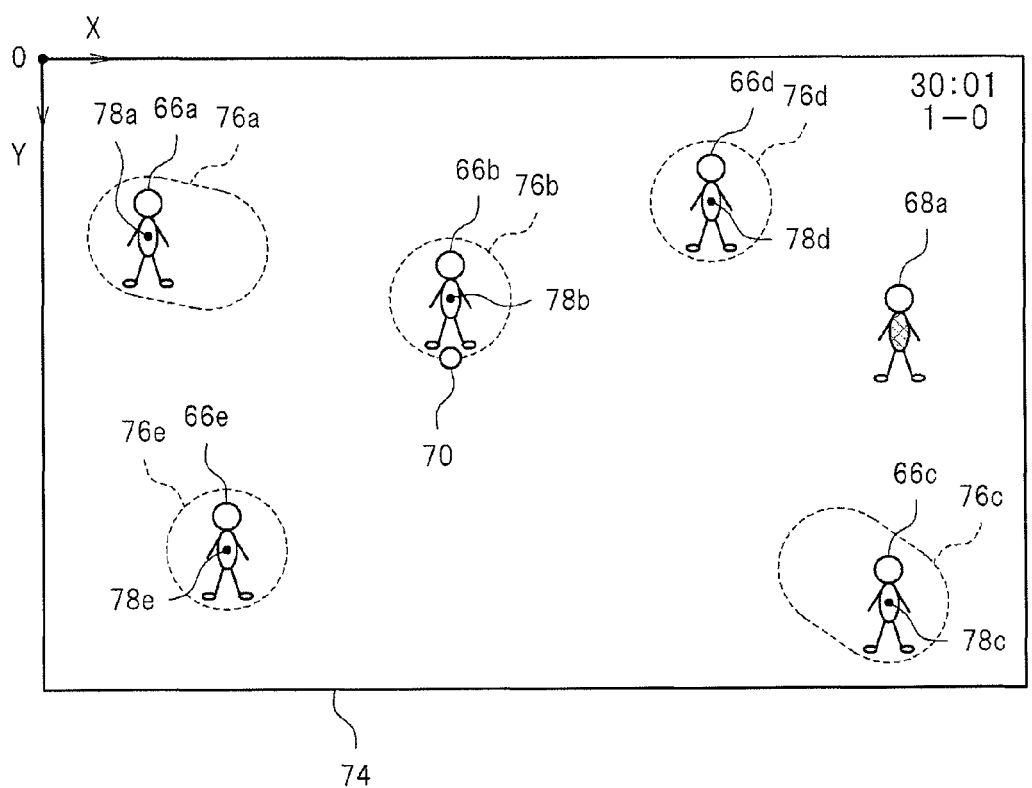
FIG. 18 is a diagram explaining one example of change of a determination area in a fifth modified example.

FIG. 18 shows one example of change of a determination area 76 (determination areas 76a, 76c to 76e) in this case. According to the cooperation parameter data shown in FIG. 17, a cooperation parameter for the combination of the player character 66a and the player character 66b is larger than a predetermined reference value (70). Also, the cooperation parameter corresponding to the combination of the player character 66b and the player character 66c is larger than the predetermined reference value (70). Therefore, in FIG. 18, only the determination area 76a for the player character 66a and the determination area 76c for the player character 66c are deformed.

According to the fifth modified example, a determination area 76 can be changed in consideration of the relationship (e.g., degree of cooperation or degree of chemistry) between player characters 66. For example, in the situation shown in FIG. 18, a user can readily select only the player characters 66a, 66d having a higher degree of cooperation with the player character 66b. That is, in the situation shown in FIG. 18, only the determination areas 76a, 76c for the respective player characters 66a, 66d having a higher degree of cooperation with the player character 66b are changed, while the other determination areas 76b, 76d are not changed. In this manner, according to the fifth modified example, as the number of determination areas 76 to be changed is reduced, a process load can be reduced.

Sixth Modified Example

For example, the determination area changing unit 112 may change the determination area 76, based on the moving direction and/or moving speed of the player character 66 corresponding to the determination area 76. Below, an example in which the determination area 76c is changed will be described.

For example, the determination area changing unit 112 may deform the determination area 76c, based on the moving direction of the player character 66c. More specifically, the determination area changing unit 112 may expand the determination area 76c in the moving direction of the player character 66c. In this case, the determination area changing unit 112 may control the degree of expansion of the determination area 76c, based on the moving speed of the player character 66c. For example, control may be made such that a faster moving speed of the player character 66c results in a larger degree of expansion of the determination area 76c.

For example, the determination area changing unit 112 may move the determination area 76c, based on the moving direction of the player character 66c. More specifically, the determination area changing unit 112 may set the determination area 76c such that the central point (the point 94 in FIG. 14) of the determination area 76c is located in a position displaced from the reference position 78c of the player character 66c in the moving direction of the player character 66c by a predetermined distance. In this case, the determination area changing unit 112 may control the distance between the central point (point 94 in FIG. 14) of the determination area 76c and the reference position 78 of the player character 66c, based on the moving speed of the player character 66c. For example, control may be made such that a faster moving speed of the player character 66c results in a longer distance between the central point of the determination area 76c and the reference position 78.

For example, the determination area changing unit 112 may enlarge the determination area 76c, based on the moving speed of the player character 66c. More specifically, the determination area changing unit 112 may control the degree of enlargement of the determination area 76c, based on the moving speed of the player character 66c. For example, control may be made such that a faster moving speed of the player character 66c results in a larger degree of enlargement of the determination area 76c.

Other Modified Examples

For example, the shape of a determination area 76 is not limited to the above described shape. The manner of changing a determination area 76 is also not limited to the above described manner.

For example, an image representing a determination area 76 may be shown in a game screen image 74. With the above, a user can visually recognize a determination area 76.

An operation means on which a user designates a position is not limited to the touch panel 22b, and may be, for example, a cross button 24c instead. In this case, a cursor which moves according to an operation of the cross button 24c may be shown in a game screen image. In this case, a user designates a position by moving the cursor, using the cross button 24c.

In this case, the display area of a cursor corresponds to a position designated by a user, and the determination unit 108 determines whether or not the cursor is at least partially included in the determination area 76 for any player character 66. Alternatively, the representative position (e.g., central point) of a cursor may correspond to a position designated by a user, and the determination unit 108 may determine whether or not the representative position is included in the determination area 76 for any player character 66.

When a game device has an operating stick (an operating lever), a user may use the operating stick as an operation means for designating a position. Further, a mouse or a pointing device disclosed in Japanese Patent No. 3262677 may be used as an operation means on which a user designates a position.

For example, the game space may be a two dimensional game space in which the position and posture of a player character and the ball are managed using two coordinate elements.

For example, the present invention can be applied to a sport game other than a soccer game or a game other than a sport game. Further, the present invention can be applied to an information processing device other than a game device.

The invention claimed is:

1. An information processing device, comprising:
    a display control unit that is configured to display a plurality of selected image candidates on a display;
    a designated position obtaining unit that is configured to obtain a position designated by a user;
    a determination unit that is configured to determine whether or not the obtained position is included in a determination area for the selected image candidate;
    a designation unit that is configured to designate, when the obtained position is included in the determination area, a selected image candidate corresponding to the determination area as a selected image; and
    a determination area change unit that is configured to change, when any of the plurality of selected image candidates is designated as the selected image, a determination area for another selected image candidate among the plurality of selected image candidates, depending on a positional relationship between one of the another selected image candidate and a determination area for the another selected image candidate, and one of the selected image and a determination area for the selected image,
    wherein the determination area change unit comprises at least one of:
    a unit that is configured to deform the determination area for the another selected image candidate by extending the determination area for the another selected image candidate toward one of the selected image and the determination area for the selected image; and
    a unit that is configured to move the determination area for the another selected image candidate toward one of the selected image and the determination area for the selected image so that a distance between a center of the determination area for the another selected image candidate and a center of the one of the selected image and the determination area for the selected image decreases.

2. The information processing device according to claim 1, wherein the selected image designated by the designation unit is a second selected image, and the designation unit designates a first selected image before the second selected image is designated, and
    the determination area change unit when the designation unit designates the first selected image and the second selected image, selects at least one of a plurality of determination areas for the plurality of selected image candidates, based on a positional relationship between one of the first selected image and a determination area for the first selected image, and one of the second selected image and a determination area for the second selected image candidate, and
        changes the selected determination area, depending on a positional relationship between one of a selected image candidate corresponding to the selected determination area and the selected determination area, and one of the second selected image and the determination area for the second selected image.

3. The information processing device according to claim 1, wherein
    the information processing device is a game device,
    the information processing device includes a storage that is configured to store a parameter so as to be correlated to a combination of game characters,
    the display control unit displays a plurality of game characters as the plurality of selected image candidates,
    the designation unit, when the obtained position is included in the determination area, designates a game character corresponding to the determination area as a selected game character, and
    the determination area change unit, when the designation unit designates a first game character among the plurality of game characters as the selected game character, changes a determination area for a second game character among the plurality of game characters, based on a positional relationship between one of the second game character and a determination area for the second game character, and one of the first game character and a determination area for the first game character, and the parameter stored so as to be correlated to a combination of the first game character and the second game character.

4. A control method for an information processing device, comprising:
    displaying a plurality of selected image candidates on a display;
    obtaining a position designated by a user;
    determining whether or not the obtained position is included in a determination area for the selected image candidate;
    designating, when the obtained position is included in the determination area, a selected image candidate corresponding to the determination area as a selected image; and
    changing, when any of the plurality of selected image candidates is designated as the selected image, a determination area for another selected image candidate among the plurality of selected image candidates, depending on a positional relationship between one of the another selected image candidate and a determination area for the another selected image candidate, and the selected image and a determination area for the selected image;
    wherein the changing comprises at least one of:
    deforming the determination area for the another selected image candidate by extending the determination area for the another selected image candidate toward one of the selected image and the determination area for the selected image; and
    moving the determination area for the another selected image candidate toward one of the selected image and the determination area for the selected image so that a distance between a center of the determination area for the another selected image candidate and a center of the one of the selected image and the determination area for the selected image decreases.

5. A non-transitory computer readable information storage medium storing a program for causing a computer to:
    display a plurality of selected image candidates on a display;
    obtain a position designated by a user;
    determine whether or not the obtained position is included in a determination area for the selected image candidate;
    designate, when the obtained position is included in the determination area, a selected image candidate corresponding to the determination area as a selected image; and
    change, when any of the plurality of selected image candidates is designated as the selected image, a determination area for another selected image candidate among the plurality of selected image candidates, depending on a positional relationship between one of the another selected image candidate and a determination area for the another selected image candidate, and the selected image and a determination area for the selected image, wherein the determination area for the another selected image candidate is changed by at least one of (i) deforming the determination area for the another selected image candidate so as to expand toward one of the selected image and the determination area for the selected image, and (ii) moving the determination area for the another selected image candidate toward one of the selected image and the determination area for the selected image so that a distance between a center of the determination area for the another selected image candidate and a center of the one of the selected image and the determination area for the selected image decreases.

6. A game device comprising:

at least one microprocessor coded to:

control a display to display a plurality of selected image candidates of a game on the display;

obtain a position designated by a user;

determine whether or not the obtained position is included in a determination area for the selected image candidate;

designate, when the obtained position is included in the determination area, a selected image candidate corresponding to the determination area as a selected image; and change, when any of the plurality of selected image candidates is designated as the selected image, a determination area for another selected image candidate among the plurality of selected image candidates, depending on a positional relationship between the another selected image candidate and a determination area for the another selected image candidate, and one of the selected image and a determination area for the selected image, wherein the determination area for the another selected image candidate is changed by at least one of (i) deforming the determination area for the another selected image candidate so as to expand toward one of the selected image and the determination area for the selected image, and (ii) moving the determination area for the another selected image candidate toward one of the selected image and the determination area for the selected image so that a distance between a center of the determination area for the another selected image candidate and a center of the one of the selected image and the determination area for the selected image decreases.

\* \* \* \* \*